Dec. 5, 1950     H. ZIEBOLZ     2,533,079
ELECTRIC MEASURING SYSTEM

Filed May 3, 1946

Inventor
HERBERT ZIEBOLZ
By Ralph B. Stewart
Attorney

Patented Dec. 5, 1950

2,533,079

UNITED STATES PATENT OFFICE 2,533,079

ELECTRIC MEASURING SYSTEM

Herbert Ziebolz, Chicago, Ill., assignor to Askania Regulator Company, a corporation of Illinois Application May 3, 1946, Serial No. 666,976

7 Claims. (Cl. 171—95)

This invention relates to electric measuring systems and in particular to systems for measuring alternating current or voltage.

An object of the invention is to devise a system for the measurement of the peak value of an alternating current or voltage.

Another object of the invention is to devise a system to automatically produce a direct current or voltage proportional to the peak value of an alternating current or voltage.

Other objects will be apparent from the following description taken in connection with the accompanying drawing in which Figure 1 is a diagrammatic showing of one embodiment of my measuring system;

Figure 1:
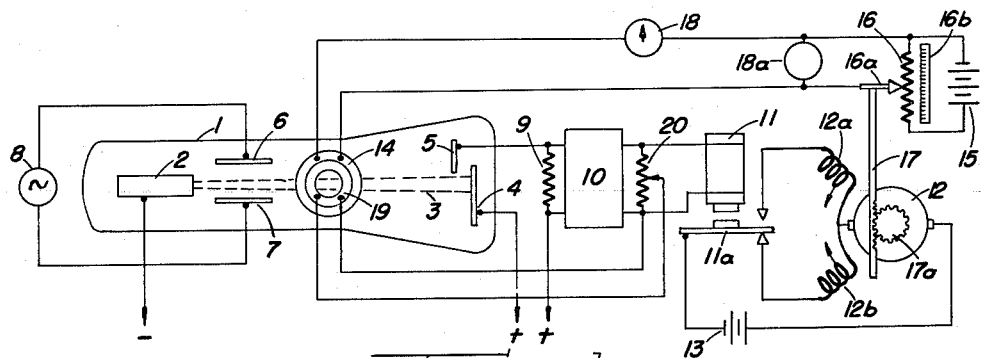

Referring to Figure 1, a cathode ray tube 1 is provided at one end thereof with an electron gun 2 which directs an electron beam 3 towards a collector electrode 4 located in the other end of the tube. A working anode 5 is located near the normal position of the beam 3 but normally does not receive any substantial number of electrons from the beam. The tube is also provided with a pair of deflecting plates 6 and 7 which are energized by the alternating current source 8 to be measured. The plates 6 and 7 are arranged to deflect the beam 3 towards and away from the anode 5 which is connected to the positive terminal of the plate supply source through a coupling resistance 9. An amplifier 10 has its input connected across the coupling resistance 9 and supplies the winding of relay 11, the armature 11a of which controls two energizing circuits of a reversible motor 12 through field windings 12a and 12b, the circuits being energized from a suitable source represented by battery 13.

The tube 1 is provided with a second deflecting system represented by the deflecting coil 14 arranged to deflect the beam in the same plane as the deflecting plates 6 and 7. While only one coil 14 is shown in the drawing, it will be understood that in actual practice a similar coil may be arranged on the other side of the tube and the two coils connected in series. Deflecting coil 14 is energized from a suitable source of direct current represented by the battery 15, and the amount of energizing current supplied to the coil is controlled by potentiometer 16 having a movable contact 16a operated by the motor 12 through a suitable connection represented by the rack 17 engaging pinion 17a on the motor 12. A scale 16b is provided to indicate the position of the variable contact 16a. A meter 18 is provided to indicate the value of the current supplied to coil 14.

Operation of Figure 1 is as follows: In the normal position of the beam 3, the beam passes just below the lower edge of the anode 5 as shown in Figure 1, and also as shown in the position a in Figure 2. In this position anode 5 receives substantially no electrons from the beam and the relay 11 is de-energized, and the circuit of motor 12 is completed through the field winding 12b which operates the motor in a direction to move the sliding contact 16a upwardly and to thereby decrease the current supplied to deflecting coil 14. This coil is connected in a direction to deflect the beam 3 away from anode 5, and when the voltage from source 8 is zero, the motor 12 will continue to move the contact 16a upwardly until it reaches the zero position.

Assume now that an A. C. potential is applied to plates 6 and 7, the beam 3 will be caused to oscillate about its normal position, and anode 5 will be energized by a series of pulses which will cause the relay 11 to operate and reverse the direction of operation of motor 12, thereby energizing the coil 14 which serves to deflect the beam so that its mean position moves away from the anode 5. The motor 12 will continue to operate until the oscillating beam no longer strikes the anode 5 as shown in the position b in Figure 2. In this position the solid circle represents the mean position of the beam, while the dotted lines above and below the solid circle represent the path traversed by the beam on both sides of its mean position. In position b relay 11 releases, but the momentum of the motor may cause the beam to be deflected slightly beyond the position b to the position c. After this motor 12 reverses and drives the contact 16a upwardly which allows the mean position of the beam to move closer to the anode 5 as shown in the position d in Figure 2 where the relay 11 will again pick up and reverse the direction of rotation of motor 12. From the foregoing it will be understood that the motor 12 will be operated alternately in opposite directions so that the beam oscillates between the positions c and d in Figure 2, and the contact 16a on potentiometer 16 will have a slight oscillatory ment about a mean position which can be indicated on the scale 16b. The amount of current in coil 14 necessary to move the beam to the position b in Figure 2 will serve as an indication of the peak value of the alternating voltage supplied from the source 8, and the meter 18 may be calibrated in terms of peak voltage value of the source 8. Also, the scale 16b associated with potentiometer 16 may be calibrated in terms of peak voltage of the source 8.

Figure 3:
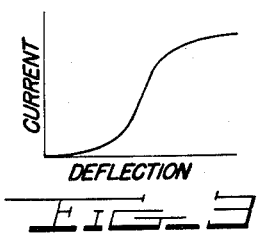
Figures 3 and 4 are curves showing the tube characteristics under different conditions of operation of Figure 1.

Figure 3 shows the characteristic of the cathode ray tube when operated as described above, that is, it shows the variation in the anode current with the amount of deflection of the beam from its normal position towards the anode.

Figure 4:
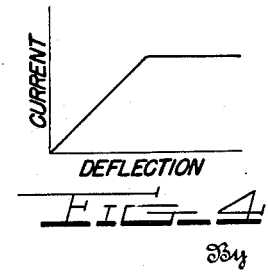

The operating characteristic of the tube may be converted to the form shown in Figure 4 by providing a third deflection system, such as the coil 19, energized from the output circuit of the anode 5 in a direction to provide a negative feedback action on the beam 3. While only one coil 19 is shown, a two-coil arrangement with one coil on each side of the tube would be used in practice, and the two coils would be connected in series and supplied from a potentiometer 20 connected across the output circuit of amplifier 10. It will be understood that coil 19 is connected in a direction such that when the beam 3 is moved upwardly between plates 6 and 7, the coil 19 tends to move the beam downwardly, and vice versa. With this arrangement, the tube characteristic becomes substantially a straight line as shown in Figure 4, which has distinct advantages over the characteristic shown in Figure 3. It will be understood, however, that in the broad aspect of my invention, the coil 19 is not essential to the invention.

While the arrangement shown in Figure 1 is adapted for the measurement of the peak value of an alternating voltage, it will be understood that the arrangement may be used for measuring the peak value of an alternating current, and for this purpose the plates 6 and 7 may be replaced by a pair of deflecting coils. It will also be understood that the coils 14 and 19 may be replaced by suitable deflecting plates if desired.

Figure 5:
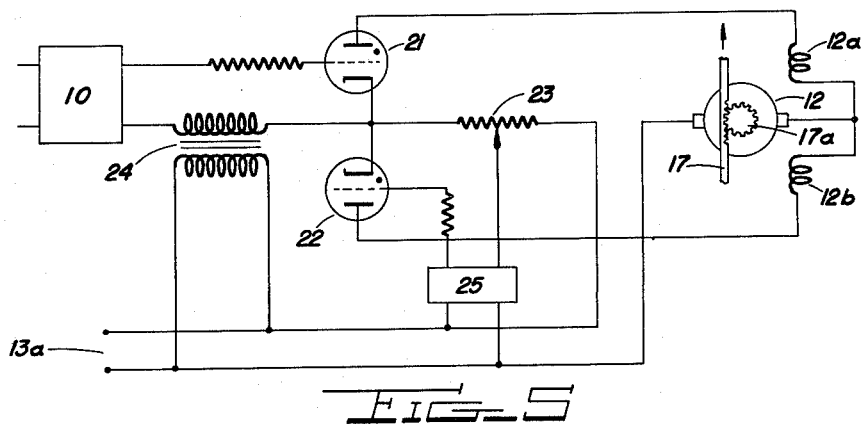
Figure 5 is a modified form of motor control circuit which may be used in Figure 1.

In Figure 5 I have shown an alternative arrangement for operating the reversible motor 12 by means of a pair of gaseous discharge tubes 21 and 22. In this arrangement the motor 12 is energized by an alternating current circuit 13a, and the motor circuit through field winding 12a is completed by means of tube 21 through a resistor 23. The motor circuit through field winding 12b is completed through tube 22 and through resistor 23 which is connected in the common cathode lead of tubes 21 and 22. The firing of tube 21 is controlled by the output of amplifier 10. A transformer 24 energized from the supply circuit 13a introduces a suppressing voltage in the input circuit of tube 21 to normally prevent the firing of this tube in the absence of a controlling voltage from amplifier 10. A biasing voltage is also supplied to the grid of tube 22 through a phase shifter 25. The return of the grid circuit of tube 22 is connected to a variable tap on resistor 23. The arrangement is such that in the absence of a signal from amplifier 10, tube 21 remains inoperative but tube 22 fires during each cycle and drives motor 12 in a direction to decrease the current supplied to coil 14.

Figures 2, 6, 7:
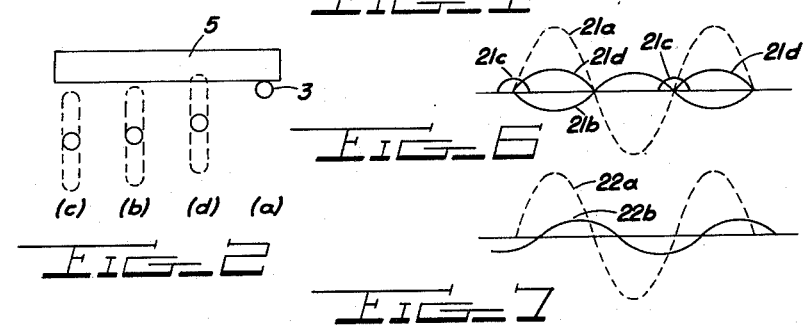
Figure 2 is a diagram illustrating the operation of Figure 1.
Figures 6 and 7 are curves illustrating the operation of Figure 5.

The operation of Figure 5 may be explained by reference to Figures 6 and 7. In Figure 6, the curve 21a shows the anode voltage applied to tube 21, and curve 21b is the biasing voltage applied to the grid of tube 21 to normally prevent firing of the tube. 21c represents the small signal pulse produced each time the electron beam strikes the anode 5 when oscillating about a mean position such as that shown at d in Figure 2. The frequency of the circuit 13a must be the same as the source 8, and a proper phase relation must be established so that the pulses 21c occur at the beginning of the positive pulses of the anode voltage curve 21a as shown in Figure 6. The loops 21d represent the anode current pulses flowing in tube 21 during the positive pulses of curve 21a.

In Figure 7, the curve 22a shows the anode voltage of tube 22, and 22b shows the grid-biasing voltage which lags behind curve 22a to prevent firing of tube 22 before tube 21 has had a chance to fire. Normally, with tube 21 inoperative, tube 22 will fire in each positive pulse of curve 22a, at about the instant that curve 22b becomes positive. If tube 21 fires during each cycle, the current pulses 21d flowing in resistor 23 impress a negative bias upon the grid of tube 22 of sufficient magnitude to prevent firing of this tube during any cycle in which tube 21 fires. Thus the firing of tube 21 prevents the firing of tube 22, and the motor 12 is caused to operate in the opposite direction.

The output voltage of potentiometer 16 is proportional to the current supplied to deflecting coil 14 and, therefore, is proportional to the peak value of the alternating current source 8. Accordingly, the peak value of source 8 may be indicated by voltmeter 18a connected across the output of potentiometer 16. It will be understood that battery 15 and potentiometer 16 are merely representative of a suitable source of direct current that can be varied by motor 12, and this source may assume other forms such as a generator having a variable field circuit controlled by motor 12.

In the appending claims the term "current" is to be interpreted broadly to include voltage.

What I claim is:

1. A system for measuring the peak value of an alternating current comprising a cathode ray tube having means for producing an electron beam normally directed along a predetermined axis, an anode positioned adjacent said beam and substantially out of the normal path thereof, deflecting means energized by said alternating current for alternately deflecting said beam towards and away from said anode at the frequency of said alternating current, deflecting means for shifting the mean position of said beam away from said anode, a source of direct current for energizing said second deflecting means, means controlled by electrons striking said anode for increasing said direct current until said beam does not strike said anode, and an indicator energized by said direct current for indicating the peak value of said alternating current.

2. A measuring system according to claim 1 and including a third deflecting means for said tube, and means controlled by the electrons received by said anode for varying the energization of said third deflecting means to produce a negative feedback action on said beam.

3. In combination, a source of alternating current, a cathode ray tube having means for producing an electron beam normally directed along a predetermined axis, an anode positioned adjacent said beam and substantially out of the normal path thereof, deflecting means energized by said alternating current for alternately deflecting said beam towards and away from said anode at the frequency of said alternating current, deflecting means for shifting the mean position of said beam away from said anode, a source of direct current for energizing said second deflecting means, means tending normally to decrease the direct current energizing said second deflecting means, and means controlled by electrons striking said anode for increasing said direct current until said beam does not strike said anode.

4. In combination, a source of alternating current, a cathode ray tube having means for producing an electron beam normally directed along a predetermined axis, an anode positioned adjacent said beam and substantially out of the normal path thereof, deflecting means energized by said alternating current for alternately deflecting said beam towards and away from said anode at the frequency of said alternating current, deflecting means for shifting the mean position of said beam away from said anode, a source of direct current for energizing said second deflecting means, reversible means operable to increase or decrease said direct current, control means for normally operating said reversible means in a direction to decrease said direct current, and means responsive to electrons striking said anode to reverse the operation of said reversing means.

5. In combination, a source of alternating current, a cathode ray tube having means for producing an electron beam normally directed along a predetermined axis, an anode positioned adjacent said beam and substantially out of the normal path thereof, deflecting means energized by said alternating current for alternately deflecting said beam towards and away from said anode at the frequency of said alternating current, deflecting means for shifting the mean position of said beam away from said anode, a source of direct current for energizing said second deflecting means, a reversible electric motor operable in one direction to increase said direct current and in the opposite direction to decrease said direct current, relay means for normally energizing said motor for operation in a direction to decrease said direct current, and means responsive to electrons intercepted by said anode for operating said relay to a position to effect reversal of operation of said motor.

6. A combination according to claim 5 wherein said relay means comprises an electromagnetic relay having a movable armature and cooperating contacts for normally energizing said motor for operation in one direction when said armature is in released position, and further contacts for reversing the operation of said motor when said armature is in operated position.

7. A combination according to claim 5 wherein said relay means comprises a pair of three-element gaseous tubes for energizing the forward and reverse operating circuits of said motor from a source of alternating current, means supplying a biasing wave to the grid of one of said tubes to normally cause delayed firing thereof in each cycle of anode voltage, said other tube being controlled by signals developed at the anode of cathode ray tube by said beam and having a biasing wave applied to the grid element thereof to normally prevent firing of said gaseous tube in the absence of a signal from said cathode ray tube, and a connection between said gaseous tubes for preventing the firing of the normally operative tube whenever the normally inoperative tube fires.

HERBERT ZIEBOLZ.

REFERENCES CITED

The following references are of record in the file of this patent:

UNITED STATES PATENTS

| Number | Name | Date |
|---|---|---|
| 1,976,400 | Ilberg | Oct. 9, 1934 |
| 2,027,393 | McCreary | Jan. 14, 1936 |
| 2,096,012 | Soller | Oct. 19, 1937 |
| 2,191,185 | Wolff | Feb. 20, 1940 |
| 2,305,617 | Hansell | Dec. 22, 1942 |
| 2,314,302 | Ziebolz | Mar. 16, 1943 |
| 2,358,901 | Ziebolz | Sept. 26, 1944 |
| 2,360,751 | Ziebolz | Oct. 17, 1944 |
| 2,363,791 | Holden | Nov. 28, 1944 |